United States Patent [19]

Crandall et al.

[11] 4,335,354

[45] Jun. 15, 1982

[54] SENSITIVE DEMODULATOR FOR FREQUENCY SHIFT KEYED CARRIER SIGNALS

[75] Inventors: Kenneth C. Crandall, Foster City; Michael A. Robinton, Palo Alto, both of Calif.

[73] Assignee: Robinton Products, Inc., Sunnyvale, Calif.

[21] Appl. No.: 137,488

[22] Filed: Apr. 4, 1980

[51] Int. Cl.³ .............................................. H03D 3/00
[52] U.S. Cl. ................................... 329/126; 329/110; 375/88
[58] Field of Search ........................ 329/110, 126, 134; 375/88, 89, 90, 91

[56] References Cited

U.S. PATENT DOCUMENTS 3,437,932  4/1969  Malakoff ........................... 375/88 X
3,474,341 10/1969  Crafts et al. ...................... 375/91 X

*Primary Examiner*—Siegfried H. Grimm
*Assistant Examiner*—Edward P. Westin
*Attorney, Agent, or Firm*—C. Michael Zimmerman

[57] ABSTRACT

A demodulator for frequency shift keyed carrier signals is described. A conditioned F.S.K. signal is simultaneously fed to a pair of rising edge triggered single shot voltage generators, such carrier signal being inverted prior to being fed to one of such single shots. The single shots are each triggered upon receipt of a cycle edge to initiate an output pulse having a duration falling between the time intervals distinctive of the cycles of the two possible carrier signal frequencies. The next rising edge received by each causes the respective single shots to retrigger, and latches the previous output of each into the first element of an associated serial memory device. The successive elements of each of the serial memory devices, store the state output signals of adjacent cycles of the carrier signal, with the states in one of such devices being one-half cycle apart from the states in the other. The outputs of all the elements of the two serial storage devices are connected to corresponding inputs of a majority logic gate, and such elements are triggered simultaneously to furnish output signals to such majority logic gate upon receipt of a carrier signal rising edge. The result is that the majority logic gate produces a demodulated digital output signal which is representative of the digital states of a majority of the carrier signal cycles examined.

16 Claims, 4 Drawing Figures

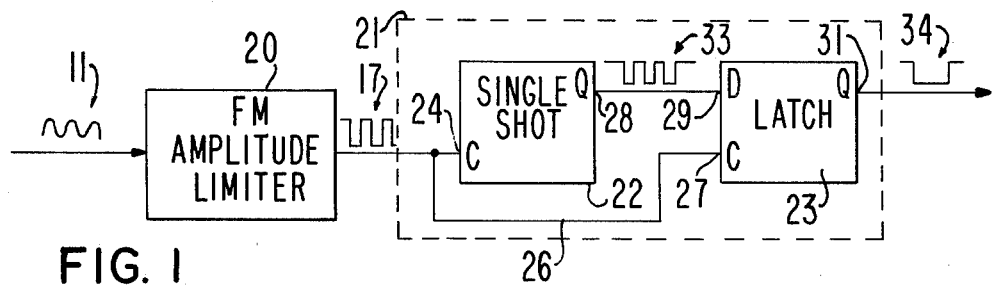
FIG. 1
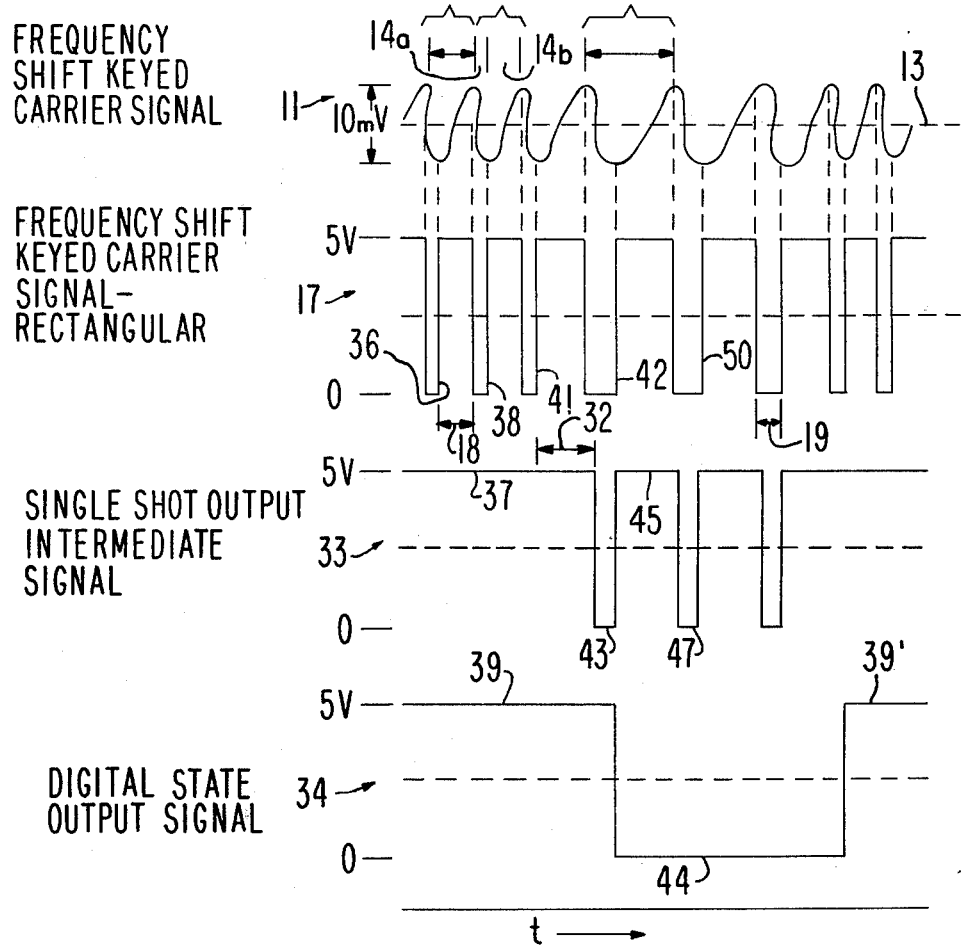

SENSITIVE DEMODULATOR FOR FREQUENCY SHIFT KEYED CARRIER SIGNALS

BACKGROUND OF THE INVENTION

The present invention relates to a demodulator for a frequency shift keyed carrier signal of the type typically employed in data communications and magnetic storage applications. More particularly, the present invention relates to such a demodulator which is digitally implemented and provides increased sensitivity, improved noise immunity, and widened operating temperature range.

Frequency shift keyed (F.S.K.) carried signals are commonly used to transmit digital data from one location to another. That is, an alternating current carrier signal is provided with a number of differing frequencies (two in a binary digital arrangement) respectively representing differing digital states. For example, alternating carrier signals generated to convey binary digital data in one direction over a telephone distribution network, typically have frequencies of 1070 Hz and 1270 Hz representing the two different digital states. Before the digital information represented by such a signal can be utilized at the reception point, it is often necessary to "decode" the frequencies to provide discrete voltage state levels representing the digital data. This conversion typically is achieved by a demodulator especially designed for such purpose, known as a "frequency shift keyed demodulator".

Prior to being fed to such a demodulator for demodulation, F.S.K. carrier signals are conditioned to provide standard logic voltage levels. That is, such a carrier typically is of a low voltage sinusoidal waveform, which is amplified and clipped prior to being demodulated to provide a rectangularly shaped waveform having high and low voltage levels corresponding to the voltage levels representing the digital data.

Most frequency shift keyed demodulators generally employ for such decoding, frequency discrimination characteristics of filters or the like, or phase-locked loop circuitry. However, some F.S.K. demodulators discriminate between the two different frequencies by determining the time intervals between each half-cycle of a carrier signal. Thus, two measurements per full cycle are made. For example, the time between adjacent rising and falling edges of the amplified, rectangular signal discussed above, often is measured. This method offers the possibility of permitting a relatively high transmission rate. The problem, though, is that this method relies on good waveform symmetry, i.e., assumes that the time interval for a half-cycle is equal to one-half the time interval of a full cycle. This is often not the case. Amplifiers are used to condition the signal and generally do not provide a symmetrical waveform gain, with the result that erroneous determinations can be made.

SUMMARY OF THE INVENTION

The present invention provides a demodulator for a frequency shift keyed carried signal which relies on full cycle time measurements and, in the preferred embodiment, does so without reducing the possible data transmission rate. Such demodulator relies on digital techniques and provides high noise immunity, temperature stability and component insensitivity without the need for manual trimming.

In basic terms, the demodulator of the invention includes means, such as a simple single shot, which is responsive to occurrence of a first one of a pair of selected voltage characteristic points in a cycle of a F.S.K. carrier signal (for example, the occurrence of the first of the two rising edges in a complete cycle) by generating an intermediate signal indicative thereof which lasts for a time period selected to be greater than the time interval of occurrence of the two selected voltage characteristic points in a cycle representative of one of the digital indicia, but less than the time interval between such two characteristic points if the cycle represents a different digital state. The state of the single shot is sampled at the time of occurrence of the second characteristic point. It will be recognized that this state will be representative of which of the frequencies of the carrier signal the cycle responsible for such characteristic points is a part. In other words, the state of the single shot at the occurrence of the second characteristic point (for example, the second leading edge) provides digital discrimination between two frequencies of the carrier signal. Most desirably, the period of time that the intermediate signal representation is stored is half way between (the arithmetic mean) the two carrier period intervals. The likelihood of errors due to improper categorization of measurements, is thus reduced.

In order to avoid waveform symmetric problems entirely, it is most desirable that the voltage characteristic points be separated by one or more full cycles (a whole number multiple of 360°). It will be recognized, though, that such separation will reduce the number of measurements which can be made, relative to the number of measurements which can be made by F.S.K. demodulators which rely on half-cycle measurements. As another salient feature of the instant invention, it enables half-cycle measurements to be made without detracting from the lack of waveform symmetry problems associated with full-cycle measurement. That is, in the preferred embodiment of the invention the time intervals between two separate pairs of voltage characteristic points in a cycle are measured. These measurements are compared to arrive at a decision with respect to which frequency is represented by the cycles being measured. The result is that waveform symmetry problems are avoided in view of the full-cycle measurements, but measurements are made at each half cycle.

As will become apparent from a description of the preferred embodiment, for increased reliability it is preferable that the digital states represented by a plurality of generally adjacent frequency cycles be used to generate the ultimate demodulated data output signal. Thus, the ultimate demodulated data signal is based on more than one frequency cycle. Of course, the number of cycles which are used to generate such data output signal should be no greater than the number of carrier cycles allowed between frequency keyed transitions. For maximum noise immunity, this number should be as large as practical.

The invention includes other features and advantages which will become apparent from the following more detailed descriptions of specific implementations, including a description of the best mode contemplated by the inventor of carrying out the invention.

BRIEF DESCRIPTION OF THE DRAWINGS

FIG. 1 is a block diagram of a preferred embodiment of the instant invention, incorporating its basic principles;

FIG. 2 is a graphical representation of the voltage waveforms of various signals relevant to the instant invention;

DESCRIPTION OF PREFERRED EMBODIMENTS

Figure 3:
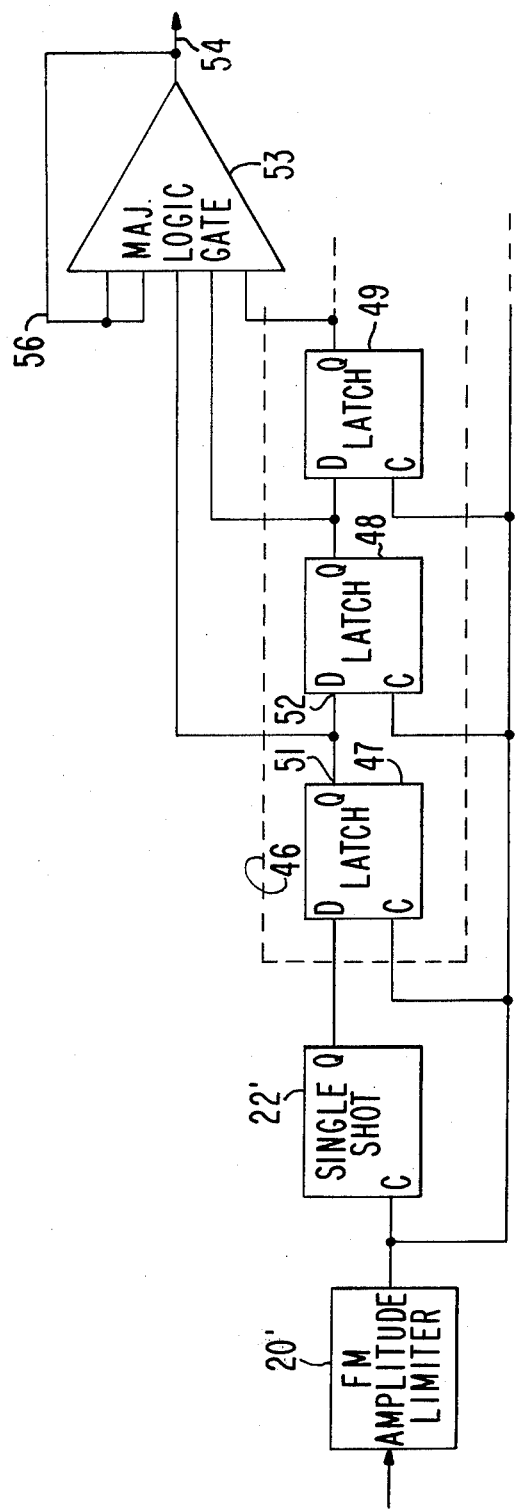
FIG. 3 is a block diagram illustrating a preferred embodiment of the invention having a significant additional feature.

FIG. 1 is a block diagram of a simplified demodulator incorporating the present invention, whereas FIG. 2 illustrates samples of waveform shapes taken at various locations. A typical frequency keyed carrier signal as transmitted over, for example, a telephone distribution network, is represented by the voltage waveform 11 in FIG. 2. Such signal has cycles of two differing frequencies representative of two different digital indicia. It has a relatively low voltage, e.g., 10 millivolts as illustrated, and is generally sinesoidal in form. However, each cycle of the same signal typically is non-symmetrical. That is, as is illustrated, it is not unusual for the voltage waveform to be skewed or otherwise distorted from a true sinusoidal waveform, in each cycle. It is also typical, though, that adjacent cycles of each frequency be basically identical, insofar as such distortions are concerned.

A full wavelength of one of the two frequencies represented by the waveform 11, is denoted at 12. That is, the time interval represented at 12 is the time interval of the two frequencies between successive voltage peaks of a cycle of the higher (shorter time interval) of the two frequencies of the carrier signal. The time interval represented at 14 is that of the successively adjacent cycle, which is of the same frequency as the cycle responsible for time interval 12 and is of the same duration as shown. It is to be noted, however, that because of the symmetry problems discussed above, the half-cycle time intervals 14a and 14b are not equal to one another; the duration of the time intervals represented at 14a is shorter than the duration represented at 14b. However, because the distortion of adjacent cycles of the same frequency is identical, the half-cycle discrepancies represented at 14a and 14b are also present in the preceding waveform whose wavelength is represented at 12.

As discussed previously, it is typical to demodulate a frequency keyed carrier signal to provide discrete voltage state levels representing the digital data. Prior to such demodulation, the F.S.K. carrier signal usually is conditioned to define the high and low voltage levels corresponding to the voltage levels desired to represent such digital data. More particularly, with reference to FIG. 1, the basic F.S.K. carrier signal is fed to an amplitude limiter 20 which, as is conventional, amplifies and clips the voltage of the same to provide a rectangular shaped waveform having relative frequencies corresponding to the relative frequencies of the basic carrier signal 11. The discrete voltage levels selected for the conditioned F.S.K. carrier signal are, of course, dependent upon the voltage levels desired for subsequent data processing. Commonly, the carrier signal is conditioned to provide a zero voltage level representing a "low" digital indicia, and a 5-volt voltage level representing a "high" digital indicia.

The effect of non-symmetrical waveforms in the basic carrier signal on half-cycle wavelengths, is carried over to the conditioned, F.S.K. signal. Moreover, the amplification provided by the FM limiter often significantly exacerbates the problem. Thus, it is not unusual for the shorter frequency (longer wavelength) half-cycle of one of the frequencies, to approach the longer frequency (shorter wavelength) half-cycle of the other data frequency. This is represented by the half-cycle wavelengths 18 and 19 of the waveform 17 shown in FIG. 2.

Some demodulators now available for frequency shift keyed carrier signals measure half-cycle wavelengths (the time intervals between the occurrence of events in the voltage which are one-half cycle apart). That is, they measure the time between adjacent rising and falling edges of a conditioned, rectangular signal. However, it will be recognized that because of the frequency distortions due to the non-symmetry problems discussed above, half-cycle measurements are subject to errors in frequency determination. Such errors have resulted in prior demodulators of this type being too unreliable for some implementations, especially ones requiring high data transmission rates, i.e., detection of relatively frequent frequency shifts in a carrier signal.

The demodulator of the instant invention is quite simple and yet enables the above problem to be overcome. FIG. 1 illustrates an embodiment of the invention which includes the basic aspects thereof. Such demodulator is represented by the dotted line enclosure 21 and simply includes in combination in the particular manner described below, a simple single shot voltage generator 22 and a memory latch 23. As illustrated, the output terminal of limiter 20 is connected to the clock input terminal 24 of single shot 22 to thereby direct the conditioned, F.S.K. carrier signal thereto. Moreover, the conditioned carrier signal is fed as represented by line 26, to the clock input terminal 27 of latch 23.

Single shot voltage generator 22 is selected to produce a desired voltage output level at its output terminal 28, in response to receipt at its clock input terminal 24, of a voltage event characteristic of a particular point in a cycle of a conditioned carrier signal. Most simply, single shot 22 is edge-triggered, and produces the output voltage at terminal 28, upon the occurrence of successive rising edges or successive falling edges of the conditioned carrier signal.

Single shot voltage generator 22 is designed to maintain the selected voltage level at its output terminal 28, for a predetermined period of time. As will become more apparent from the ensuing description, it is important that the duration of such voltage level be quite reliable. For this reason, it is most desirable that single shot voltage generator 22 be digitally implemented using a crystal oscillator for clocking such duration, as opposed to a capacitor.

The output terminal 28 of single shot 22 is connected to the data input terminal 29 of memory latch 23. Latch 23 can most simply be an edge-triggered, D-flip-flop. It thus "stores" a representation of the voltage state at its data input terminal 29, and upon receiving a triggering signal at its clock input terminal 27, transmits to its output terminal 31 a representation of the voltage state at its data input terminal 29. Most desirably, memory latch 23 is triggered by occurrence of the same voltage event in the carrier signal that activates single shot 22. That is, it is preferable that such latch most desirably is responsive to the same successive rising or the same successive falling edges to which single shot 22 reacts.

The period of time that single shot 22 maintains its output terminal 28 at a voltage level representative of the receipt of an actuating signal at its clock input terminal and, hence, the time interval latch 23 maintains a representation of such output at its data input terminal, is selected to fall between the time intervals distinctive of cycles of the two frequencies of the carrier signal. This intermediate period of time is represented in FIG. 2 by interval 32. Its use will result in the output signal at terminal 31 of latch 23 indicating which one of the two frequencies is represented by the cycle of the carrier signal being examined at the time. This will be understood from the following description of the reaction of the demodulator to receipt of a succession of carrier signal cycles, a train of which represents one of the frequencies and a train of which represents the other, as is illustrated in FIG. 2. More particularly, upon receipt of, for example, a rising leading edge of an F.S.K. carrier signal cycle, single shot 22 will place a voltage level of, for example, 5 volts, at its output terminal 28 for the predetermined period of time mentioned above. Latch 23 will "store" such voltage level at its data input terminal 29 for such predetermined time.

The next successive rising edge of the conditioned F.S.K. cycle wil cause latch 23 to place at its output terminal 31, a representation of the state then at its input terminal 29. As mentioned previously, the duration of the voltage state applied to such input terminal upon receipt of a cycle leading edge by single shot 22 is selected to fall between the cycle time durations of the two carrier signal frequencies. Thus, when latch 23 receives the next successive leading edge and clocks the state at such time of its input 29 to its output, such output will be dependent of the frequency of the carrier signal cycle then being examined.

The above phenomenon is represented by the voltage waveforms shown in FIG. 2. Waveform 33 represents the voltage states at output terminal 28 of single shot 22 and hence, at input terminal 29 of latch 23, corresponding to the carrier signal frequencies represented by waveform 17. The consequent output of latch 23 is represented by waveform 34.

Single shot 22 reacts to receipt of the leading edge 36, for example, of the conditioned F.S.K. carrier signal, by placing a predetermined voltage state at its output terminal 28. This voltage state is represented in waveform 33 as a high voltage state by line 37. Such voltage state is applied to the data input terminal 29 of the latch 23 and, as mentioned before, is selected to have a duration falling between the time intervals distinctive of the two periods provided by the F.S.K. carrier signal. Thus, when the next successive rising edge of the carrier signal, edge 38, is received by latch 23, the state of the input of such latch transmitted to its output will be representative of such high voltage state. This high state is represented by high voltage state line 39 of output signal 34.

The same F.S.K. carrier signal leading edge 38 which clocks latch 23, is also supplied to clock input terminal 24 of single shot 22 to retrigger the same. Thus, the intermediate signal furnished by its output terminal 28 will again be triggered to remain at the high output state for the selected predetermined period of time. This is represented by the continuous nature of line 37 of signal 33. And since leading edge 41 is the end of a cycle of the higher carrier signal frequency, at its time of occurrence the output of latch 31 will continue to be a high state. Again, leading edge 41 is directed to the clock input 24 of single shot 22 to retrigger its output for the predetermined period of time.

The cycle of which leading edge 41 represents the beginning, is the first cycle of a train of lower frequency cycles. Thus, before latch 23 is again triggered to place at its output, a representation of the voltage at its input, the time duration of the voltage state at the single shot output 28 will have expired, with the result that a different output (represented at 43 in FIG. 2) will be present thereon. Since the data input to latch 23 follows the output of single shot 22, when it is sampled by receipt at clock terminal 27 of the leading edge 42, the voltage state delivered to output terminal 31 will correspondingly be different. This different state is represented in waveform 34 of FIG.2, by line 44.

Leading edge 42 will again retrigger single shot 22 and cause its output to return to the voltage level of line 37 for the predetermined time. Line 45 of waveform 33 is representative thereof. However, prior to receipt of the next succeeding leading edge 43, such single shot will have timed out and its output will again be at a state represented by line 47 indicative of such occurrence. Thus, when the state at input terminal 29 of latch 23 is again sampled upon receipt by latch clock terminal 27 of the leading edge 43, the latch output terminal will again supply a representation of such timing out. It is for this reason that the voltage state of waveform 34 is shown remaining at such time at the state represented by line 44.

The state of output signal 34 will remain at that represented by line 44 until such time as a higher frequency cycle of the carrier signal is received and, thus, the state of such signal is again indicative of the higher frequency of the carrier signal. Its output will then return to the level represented at 39' in FIG. 2. It therefore will be recognized that the state output signal 34 is a digital representation of the two frequencies provided by the carrier signal.

In summary, it will be seen that the cycles of the F.S.K. carrier signal have a pair of selected voltage characteristic points (for example, rising leading edges) separated by time intervals of occurrence distinctive of which of the two differing frequencies each of such cycles is a part. The single shot is responsive to occurrence of the first one of such characteristic points by generating an intermediate signal indicative thereof (the voltage state represented by line 37 of waveform 33). D-type flip-flop latch 23 has at its data input terminal a representation of such intermediate signal for a period of time which falls between the time intervals distinctive of cycles of the two carrier signal frequencies, and responds to occurrence of the second one of the voltage characteristic points (the next succeeding leading edge) by generating at its output a signal which is representative of the state of such input terminal at the time of occurrence of such second characteristic point. The result is that its output is a digital representation of the frequencies carried by the F.S.K. carrier signal.

Most desirably, the predetermined period of time selected for "timing out" of single shot 22, is the arithmetic mean of the two time intervals of the two periods of the carrier signal. Thus, the predetermined time will fall halfway between such time intervals, and the likelihood of erroneous determinations will be minimized. Also, it is most desirable that the characteristic points of the carrier signal cycles which are selected, be either rising or falling edges (voltage changes between discretely different voltage levels). The occurrence of such voltage points are quite detectable and use of the same will reduce the likelihood of erroneous indications of the occurrence of a characteristic point.

Most desirably, the selected voltage characteristic points are separated from one another by one or more full cycles of the carrier signal. For best resolution, it is most desirable that they be separated from one another by only one complete cycle.

For enhanced noise immunity, it is preferred that a determination of the frequency of a carrier signal at a particular time be based upon a measurement of a plurality of cycles, rather than only one. FIG. 3 illustrates a preferred embodiment of the instant invention providing such noise immunity. It differs from the embodiment of FIG. 1 by the substitution of a serial memory device outlined at 46, for the single flip-flop latch 23. A shift register provides a suitable serial memory device for purposes of the instant invention, and its various flip-flops can be represented as in FIG. 3, by a succession of latches 47, 48, and 49. The digital state at output terminal 51 of latch 47 is derived in the same manner as the output state of latch terminal 31 of FIG. 1. It is connected, as is illustrated, to the data input terminal 52 of the next succeeding flip-flop or latch 48 so that the latter latch stores, in effect, the output state of latch 47 representative of the preceding carrier signal cycle. Latch 49 similarly stores the output of latch 48, etc. The number of elements in the serial storage device 46 is dependent on the maximum data rate. This number should be no greater than the number of carrier cycles allowed between frequency keyed transitions in the carrier signal. For maximum noise immunity, however, such number should be as large as reasonably practical up to the number of carrier cycles allowed between frequency keyed transitions.

It can be seen from the above that serial memory device 56 stores at any given time, the state output signals formed individually from a plurality of adjacent carrier signal cycles.

The clock input terminals of each of the latches of such serial memory device are all connected to receive the carrier signal simultaneously, with the result that the state at their input terminals will be clocked out to their output terminals, at the same time. Such output terminals are respectively connected as illustrated, to corresponding input terminals of a majority logic gate 53. Such gate acts, in effect, as means for comparing the state output signals which are furnished to it and generating a demodulated data output signal at its output 54 which is representative of the voltage state of a majority of the state output signals which are simultaneously received thereby. As illustrated, the output of such majority gate is fed back to two inputs thereof via feedback loop 56, with the result that the output of such gate is biased toward the status quo. It should be noted that the output of the logic gate is fed to two inputs thereof in the embodiment being described to assure that an odd number of inputs are provided so that comparison cannot result in "ties".

Serial memory device 46 stores a "history" of the digital states represented by a plurality of successively adjacent frequency cycles. Thus, the data output signal of the majority logic gate represents, in effect, the generation history of state output signals representative of the number of carrier signal cycles corresponding to the number of elements in the memory.

As mentioned previously, the voltage characteristic points selected from the carrier signal to provide clocking for the demodulator of the invention, are most desirably a full cycle apart. Thus, erroneous determinations associated with half-cycle measurements are avoided. Data transmission rates, however, are somewhat limited by such selection. That is, while because of the high noise immunity, temperature stability and component insensitivity associated with the digital implementation of the instant invention, fewer measurements need be taken before a reliable output is achieved, the data transmission rate with full cycle measurements is not as high as it could be.

Figure 4:
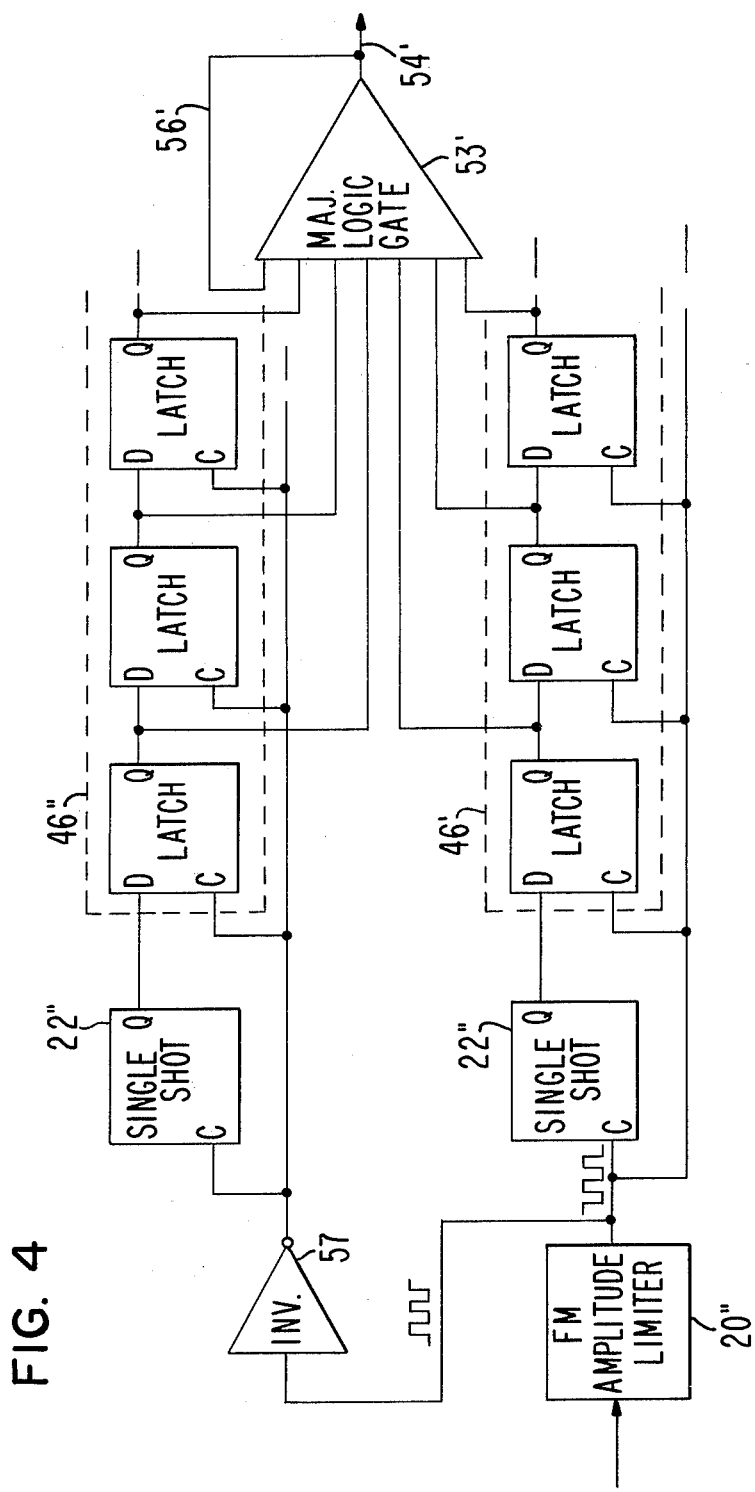
FIG. 4 is a block diagram of a preferred embodiment of the invention corresponding to the best mode contemplated by the inventors of carrying out the same.

FIG. 4, corresponding to the best mode contemplated by the inventors for carrying out the invention, represents an embodiment which essentially provides half-cycle measurements without detracting from the advantages and improvements provided by the instant invention in measuring characteristic points which are separated by a full carrier signal cycle. More particularly, with reference to FIG. 4, in will be seen that it corresponds to FIG. 3 in that it includes a single shot 22' and a serial memory 46' which feeds a majority output gate 53'. As a particularly salient feature of the instant invention, however, it further includes another single shot voltage generator 22" and serial memory device 46" which are respectively duplicates of single shot 22' and memory device 46'. The outputs of the elements of memory device 46" are connected to corresponding inputs of the majority logic gate 53'.

The embodiment of FIG. 4 includes an inverter 57 connected to receive the output of limiter 20' and invert the same prior to directing it to the duplicate single shot 22". Thus, the falling edges of the conditioned carrier signal fed to the single shot 22' are detected by single shot 22" as rising edges, in view of invertor 57. The successive elements of serial memory device 46 therefore provide at their respective outputs, digital state signals which are spaced only one-half cycle from the digital state signals produced at the very same time at the outputs of the memory elements of storage device 46'. Thus, state output signals representative of two separate pairs of voltage characteristic points in a plurality of successive cycles are simultaneously fed to the majority logic gate 53'. And because these two pairs of selected voltage characteristic points represent the rising and falling edges in the carrier signal, half-cycle measurements are being made. However, the characteristic points of each pair are spaced apart a full cycle so that half-cycle symmetry problems are avoided. The demodulated output signal appearing at the output terminal 54' of majority logic gate 53' therefore represents the result of a comparison of essentially twice the number of data outputs for a given number of cycles. A highly accurate and reliable demodulated output signal is therefore obtained. It should be noted that the output of gate 53' only fed back to one of the gate's input to bias the output of the same toward the status quo, while assuring that an odd number of inputs are activated to avoid ties.

Although the invention has been described in connection with preferred manners of implementing the same, it will be appreciated by those skilled in the art that various changes and modifications can be made without departing from its spirit. For example, while it is both preferred and anticipated at the time of filing of this application that the invention be implemented with hard-wired digital logic, it is recognized that equivalent software implementations can be substituted for parts of the same. It is therefore intended that the coverage afforded applicant be limited only by the claims and their equivalent language.

We claim:

1. A demodulator for extracting digital information from a frequency shift keyed carrier signal having cycles of at least two differing frequencies respectively representing two different digital indicia, cycles of said carrier signal of each of said differing frequencies having a first pair of selected voltage characteristic points separated in a cycle by time intervals of occurrence distinctive of which of said two differing frequencies is represented thereby, comprising:
   A. means responsive to occurrence of a first one of said first pair of voltage characteristic points in a cycle of said carrier signal by generating an intermediate signal indicative thereof; and
   B. means for furnishing a first state output signal representative of said intermediate signal for a predetermined period of time falling between the time intervals distinctive of cycles of said two frequencies and responsive to occurrence of the second one of said first pair of voltage characteristics by conforming said first state output signal to one representative of the state of said furnishing means at the time of said occurrence of said second one of said characteristic points;
   whereby said state output signal is representative of the frequency of the carrier signal cycle having said first pair of voltage characteristic points.

2. A demodulator according to claim 1 wherein there are two of said time intervals, each of which is respectively associated with a corresponding one of said two differing frequencies; and said means for furnishing said state output signal predetermined period of time is adapted to furnish the same for a period of time generally equal to the arithmetic mean of said two time intervals.

3. A demodulator according to claim 1 or to claim 2 wherein each of said first pair of selected voltage characteristic points are separated from one another generally by a whole number multiple of a full cycle of said carrier signal.

4. A demodulator according to claim 1 or to claim 2 wherein said cycles of said two differing frequencies have a generally rectangular voltage shape, and said pair of voltage characteristic points are successively occurring points in a cycle at which the voltage represented thereby changes from a particular voltage level to a discretely different voltage level.

5. A demodulator according to claim 1 or to claim 2 wherein said means responsive to occurrence of a first one of said pair of voltage characteristic points in a carrier signal cycle is a voltage generator which provides a predetermined voltage state as said intermediate signal; and said means for furnishing a first state output signal representative of said intermediate signal for said predetermined period of time is a memory latch to which said frequency carrier signal is directed for detection of said second one of said pair of voltage characteristic points.

6. A demodulator according to claim 1 or to claim 2 wherein means are provided for simultaneously furnishing a set of said first state output signals respectively representative of the frequencies of a plurality of generally adjacent cycles of said carrier signal; and means are provided for comparing said state output signals and generating a demodulated data output signal representative of the voltage states of a predetermined number of said state output signals simultaneously received thereby.

7. A demodulator according to claim 6 wherein said means for simultaneously furnishing a set of said first state output signals includes memory means for storing at a given time the state output signals generated for a plurality of preceding cycles, whereby the demodulated data output signal generated by said comparison means represents the generation history of state output signals over a predetermined number of carrier signal cycles.

8. A demodulator according to claim 7 wherein said means for simultaneously furnishing said set of state output signals is a serial memory device, and said means for comparing said state output signals and generating said demodulated data output signal is a majority logic gate.

9. A demodulator according to claim 8 wherein a representation of the voltage state of the demodulated data output signal generated by said majority logic gate is fed back to the input of said gate for comparison with said state output signals to thereby bias the generation of a demodulated data output signal which favors the status quo.

10. A demodulator according to claim 9 wherein said majority logic gate is provided with an odd number of active inputs for its comparison whereby the possibility of ties is prevented.

11. A demodulator according to claim 6 wherein cycles of each of said differing frequencies of said frequency shift keyed carrier include a second pair of selected voltage characteristic points separated by time intervals of occurrence distinctive of which of said two differing frequencies is represented thereby, further including:
   A. means responsive to occurrence of a first one of said second pair of voltage characteristics in a cycle of said carrier signal by generating an intermediate output signal indicative thereof;
   B. means for furnishing a second state output signal representative of said intermediate signal for a predetermined period of time falling between the time intervals distinctive of cycles of said two frequencies and responsive to occurrence of the second one of said second pair of voltage characteristics by conforming said second state output signal to one representative of the state of said furnishing means at the time of said occurrence of said second one of said characteristic points; and
   C. means for simultaneously furnishing a set of said second state output signals respectively representative of the frequencies of a plurality of generally adjacent cycles of said carrier signal; and wherein
   D. said means for comparing said state output signals compares the state output signals of said first set with the state output signals of said second set to generate a demodulated data output signal representative of the voltage states of a predetermined number of state output signals of both of said sets.

12. A demodulator according to claim 11 wherein said cycles of said carrier signal having two differing frequencies have a generally rectangular voltage shape, and said first and second pairs of voltage characteristic points are respectively, successively occurring points in said carrier signal at which the voltage represented thereby changes from a particular voltage to a discretely different voltage level.

13. A demodulator according to claim 11 wherein said means for simultaneously furnishing a set of said state output signals, includes a serial memory device for storing at a given time the state output signals generated from said second pair for a plurality of preceding cycles, whereby the demodulated data output signal generated by said comparison means represents the generation history of state output signals generated from both said first and second pairs of characteristic points over a predetermined number of carrier signal cycles.

14. A demodulator according to claim 11 wherein said selected voltage characteristic points of said first and second pairs are separated from one another generally by a whole number multiple of half cycles of said carrier signal.

15. A demodulator according to claim 14 wherein each of said means for simultaneously furnishing said state output signals is a serial memory device; a voltage inverter is included to correspond the direction of voltage change causing the state output signals of one of said sets thereof to the other set thereof; and said means for comparing said state output signals and generating said demodulated data output signal is a majority logic gate having as inputs, state output signals of both of said sets and a representation of the voltage state of the demodulated data output signal is fed back to the input of said gate for comparison with said state output signals to thereby bias the generation of a demodulated data output signal which favors the status quo.

16. A demodulator according to claim 15 wherein said majority logic gate is provided with an odd number of active inputs for its comparison whereby the possibility of ties is prevented.

* * * * *